Dec. 29, 1942. G. BURR 2,306,543
CHANGE-SPEED GEARS
Filed Feb. 12, 1938
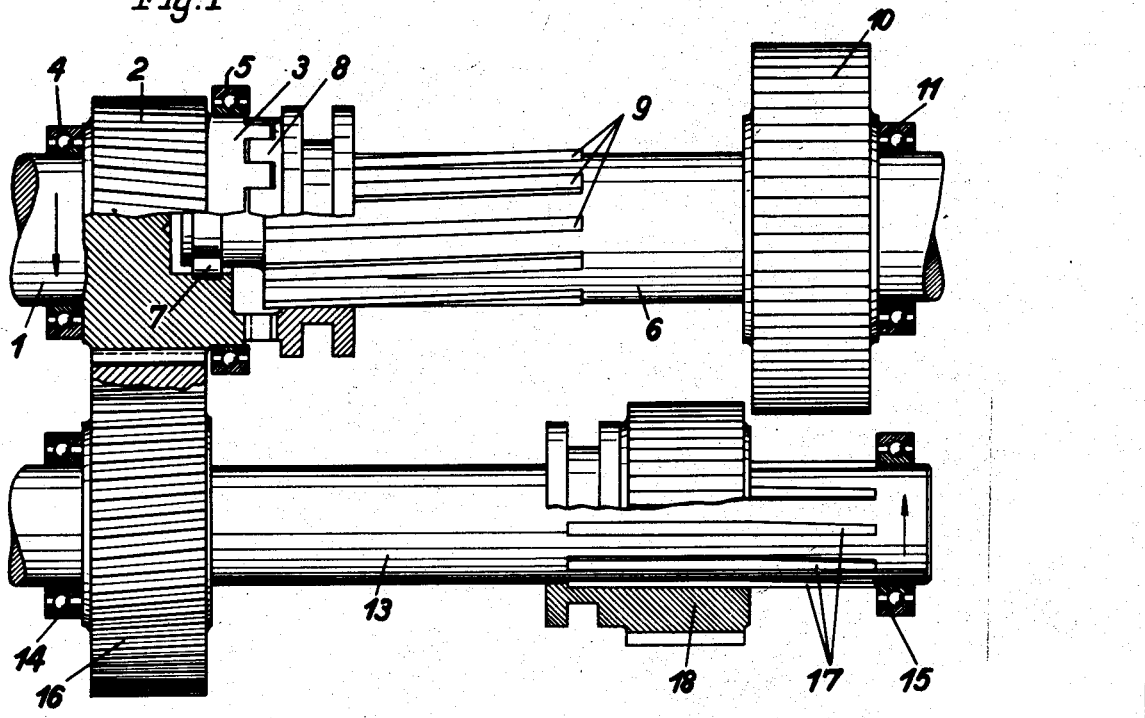
Fig. 1
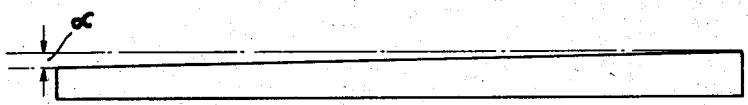
Fig. 2
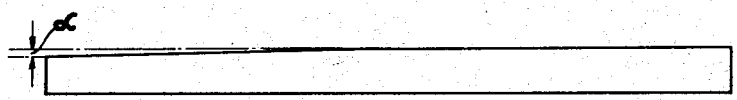
Fig. 3
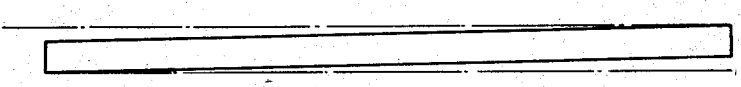
Fig. 4
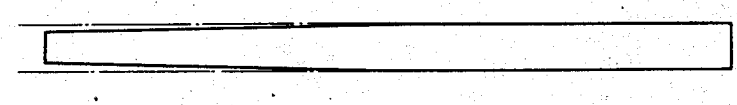
Fig. 5
Fig. 6
Inventor:
Gustav Burr
By Watson, Cole, Morse & Grindle
Attorneys.

Patented Dec. 29, 1942

2,306,543

UNITED STATES PATENT OFFICE 2,306,543

CHANGE-SPEED GEAR

Gustav Burr, Friedrichshafen-on-the-Bodensee, Germany; vested in the Alien Property Custodian Application February 12, 1938, Serial No. 190,302
In Germany March 1, 1937

8 Claims. (Cl. 74—337)

In change speed gearing, more particularly for motor vehicles, in which the various trains are engaged and disengaged by the sliding of gear parts, for example sliding gear wheels or coupling sleeves, the sliding gear parts frequently jump out of engagement, particularly after a certain length of service. The reasons for this are the wear of the bearings and journals and the resulting displacements and sagging or distortion of the various parts. The consequence of the centre displacement produced by wear in the case of journals mounted one within the other, is that the power transmitting surfaces are constantly under the action of sliding forces acting in a direction for disengagement. These forces are greater, the greater is the load on the gearing. Said forces acting for disengagement cannot be countered by the normal forces holding the sliding gear part in engagement.

In order to eliminate this disadvantage, the lateral faces of dog clutches have been bevelled for example in such a manner as to produce a force acting for the engaging movement. These attempts to improve matters, however, have not proved sufficient for keeping the sliding gear parts reliably in engagement against the sliding forces acting for disengagement also after a considerable period of service and particularly in the case of considerable torques. According to the invention, the disadvantages enumerated are eliminated by the guide elements for the longitudinal guiding of the sliding gear parts being set obliquely on their shaft elements relatively to the axis, in such a manner that a sliding force is transmitted from these guide elements to said sliding gear parts for keeping the latter in engagement. The inclination of the guide elements on the shaft extends opposite to the direction of rotation, viewed from the driving side.

The construction may be such that only the guide flank which drives in the case of forward vehicle travel is set obliquely to the shaft according to the invention, since only said flank has to transmit considerable torques, while the other flank is only stressed for the transmission of smaller forces and then normally only for a short time. For this reason, a further construction may also be such that both guide flanks are set obliquely to the shaft and parallel to one another, only the flank which drives in the case of forward vehicle travel having the obliquity in accordance with the invention. Manufacture is thereby simplified.

If considerable torques are to be transmitted by the guide flanks in both directions without the coupling members jumping out of engagement, the guide flanks according to the invention are convergently set obliquely to the axis of the shaft. Expediently, the obliquity of the guide flank or of both flanks may be provided only on that part of the shaft on which the sliding gear is situated in the engaged position.

The invention is shown diagrammatically in Figures 1 to 5 of the accompanying drawing. Figure 1 is a plan view, partly in section, showing a portion of a change speed gear selected by way of example.

Figures 2–5 inclusive are diagrammatic plan views of the guide elements for the movable clutch member, associated with the change speed gear.

I denotes a shaft part of the main shaft train of a change speed gear having fast on it a gear wheel 2, on the right-hand side of which is a dog clutch member 3. 4 and 5 are anti-friction bearings for the shaft part 1 or the gear wheel 2. Mounted in the shaft element 1 by means of a small roller bearing 7 is a shaft element 6. 8 is the sliding clutch member complementary to the dog clutch member 3. Provided on the left-hand end of shaft element 6 are guide elements 9 which guide the sliding coupling sleeve 8 on said shaft element and which are set obliquely with respect to the axis of the shaft element 6. The obliquity has been exaggerated to make it clearer. 10 is another gear wheel fast on shaft element 6. 11 is a bearing mounted beside the gear wheel 10.

13 is a part of the lay shaft of this gearing. This shaft part is journalled in the bearings 14 and 15. On the left-hand end, the gear wheel 16 is fast upon the shaft element 13, while on the right-hand end of shaft element 13 are likewise provided oblique guide elements 17 on which the gear wheel 18 is adapted to slide.

Figures 2 and 3 show constructions in which only the driving guide flank is set obliquely. The angle representing the obliquity is denoted by $a$, but in this case also it has been shown on an exaggerated scale for the sake of clearness of representation. In Figure 2, the obliquity of the driving flank extends over the entire length of the guide elements, and in Figure 3 approximately only over the length on which the sliding gear element is situated in the engaged position. Figure 4 shows an obliquity of both guide flanks parallel to one another, while Figure 5 shows a convergent obliquity of the guide flanks. In the construction according to Figure 5, the arrangement is likewise such that the obliquity of the guide flanks is provided approximately only over the part of the shaft on which the sliding gear element is situated in the engaged position. This construction has the advantage that the clearance necessary for disengagement, on account of the non-parallel flanks, is not unnecessarily increased. In the construction according to Figure 5, both the driving and driven flanks transmit to the sliding gear element, depending upon the particular direction of rotation, sliding forces which keep the gear element in engagement. The construction may also be such that the obliquities extend over the entire length of the guide elements, as shown in Figure 6 of the drawing.

In accordance with the invention, it is possible in a simple manner without any special additional measures and devices, but merely by the proposed obliquity of the guide elements, to prevent with certainty the jumping out of engagement of coupling members which has been found to be very disadvantageous in the constructions known heretofore.

I claim:

1. In a change speed gear, a shaft element with longitudinal guide splines formed thereon, one lateral flank of each spline being truly axial and at least a portion of the other being set obliquely relatively to the axis of the shaft element.

2. In a change speed gear, a shaft element with longitudinal guide splines formed thereon, one lateral flank of each spline being partly truly axial and partly set obliquely relatively to the axis of the shaft element.

3. In a change speed gear, a shaft element with longitudinal guide splines formed thereon, each spline being partly truly axial and of uniform width and partly tapering on each side.

4. In a change speed gear a shaft element with guide splines formed thereon, the lateral flanks of each spline being throughout its length inclined in opposite directions relatively to the axis of the shaft element.

5. In a change-speed gear, a shaft carrying a toothed gear-change member, interengaging guide elements on said shaft and gear-change member permitting the transmission of torque therebetween and also relative displacement of the gear-change member along the shaft, a complementary toothed gear-change member adapted to be positively engaged by said first-mentioned gear-change member when the latter is in one position on said shaft, and means for shifting said first-mentioned gear-change member into and out of said engaged position whether said shaft is rotating or not, the guide elements on said shaft and on said first-named gear-change member having mutually engaging approximately radially extending faces, certain of the faces on the guide elements being formed with an inclination with respect to the normal shifting direction, whether axial or helical, of the associated shiftable gear-change member, the inclination on any one face of a guide element being continuously in one direction, whereby during normal power transmission a force is produced on said first-mentioned gear-change member which while not materially affecting the operation of said gear-shifting means opposes the working out of engagement of the gear-change members.

6. In a change-speed gear, a shaft carrying a toothed gear-change member, interengaging guide elements on said shaft and gear-change member permitting the transmission of torque therebetween and also relative displacement of the gear-change member along the shaft, a complementary toothed gear-change member adapted to be positively engaged by said first-mentioned gear-change member when the latter is in one position on said shaft, and means for shifting said first-mentioned gear-change member into and out of said engaged position whether said shaft is rotating or not, certain of the guide elements being provided with convergent inclinations on both faces, the inclination on any one face of a guide element being continuously in one direction, so that both during normal power transmission and during the over-run a force is produced on said first-mentioned gear-change member which while not materially affecting the operation of said gear shifting means opposes the working out of engagement of the gear-change members.

7. In a change-speed gear, a shaft element with longitudinal guide splines formed thereon, at least one lateral flank of each spline being set obliquely relatively to the axis of the shaft element, the two flanks of each spline converging toward one end of said spline.

8. The device as set forth in claim 5 in which said continuous inclination is provided only on those portions of said guide elements which are in contact with said gear-change member when the latter is in its engaged position, and for the full length of said portions.

GUSTAV BURR.